(12) United States Patent
Katrak

(10) Patent No.: US 10,203,033 B2
(45) Date of Patent: Feb. 12, 2019

(54) TRANSMISSION CONTROL MODULE WITH MULTIPLE SENSOR INPUTS

(75) Inventor: Kerfegar K. Katrak, Kalamazoo, MI (US)

(73) Assignee: EATON CUMMINS AUTOMATED TRANSMISSION TECHNOLOGIES LLC, Chicago, IL (US)

( * ) Notice: Subject to any disclaimer, the term of this patent is extended or adjusted under 35 U.S.C. 154(b) by 2647 days.

(21) Appl. No.: 12/718,198

(22) Filed: Mar. 5, 2010

(65) Prior Publication Data

US 2010/0228431 A1 Sep. 9, 2010

Related U.S. Application Data

(60) Provisional application No. 61/157,976, filed on Mar. 6, 2009, provisional application No. 61/157,973, filed on Mar. 6, 2009.

(51) Int. Cl.
*G06F 19/00* (2018.01)
*F16H 61/12* (2010.01)

(52) U.S. Cl.
CPC ..... *F16H 61/12* (2013.01); *F16H 2061/1208* (2013.01); *F16H 2061/1284* (2013.01)

(58) Field of Classification Search
CPC ............. F02D 11/107; F02D 2041/227; F02D 2200/602; B60T 8/885; B60T 2250/06; B62D 5/049
USPC ..................................... 701/34, 29.2; 477/91
See application file for complete search history.

(56) References Cited

U.S. PATENT DOCUMENTS

| | | |
|---|---|---|
| 5,325,083 A | 6/1994 | Nassar et al. |
| 5,370,015 A | 12/1994 | Moscatelli |
| 5,371,487 A | 12/1994 | Hoffman et al. |
| 5,406,860 A | 4/1995 | Easton et al. |
| 5,519,393 A | 5/1996 | Brandestini |
| 5,561,416 A | 10/1996 | Marshall et al. |
| 5,601,513 A | 2/1997 | Arai et al. |
| 5,714,852 A | 2/1998 | Enderich |
| 5,736,701 A | 4/1998 | O'Brien et al. |
| 5,754,963 A | 5/1998 | Nunneley et al. |
| 5,847,344 A | 12/1998 | Denyer et al. |
| 6,018,294 A | 1/2000 | Vogel et al. |
| 6,069,988 A | 5/2000 | Kokura et al. |
| 6,072,390 A | 6/2000 | Dourra et al. |
| 6,142,909 A * | 11/2000 | Drexl et al. ..................... 477/91 |
| 6,223,113 B1 | 4/2001 | McCunn et al. |
| 6,253,136 B1 | 6/2001 | Stratton et al. |

(Continued)

*Primary Examiner* — Redhwan K Mawari
*Assistant Examiner* — Rodney P King
(74) *Attorney, Agent, or Firm* — Fishman Stewart PLLC

(57) ABSTRACT

An exemplary transmission system includes a first sensor configured to measure a quantity and output a first signal representative of the quantity measured. A second sensor is configured to separately measure the quantity measured by the first sensor and output a second signal representative of the quantity measured. A transmission control module in communication with the first sensor and the second sensor is configured to process the first signal along a primary processing path, process the second signal along a secondary processing path, compare the processed first signal to the processed second signal to determine if the primary processing path is reliable, and compare the processed first signal to the processed second signal to determine if the first sensor is reliable.

20 Claims, 4 Drawing Sheets

(56) References Cited

U.S. PATENT DOCUMENTS

| | | |
|---|---|---|
| 6,324,040 B1 | 11/2001 | Saladin et al. |
| 6,376,929 B1 | 4/2002 | Nakajima |
| 6,405,611 B1 | 6/2002 | DeJonge et al. |
| 6,411,879 B2 | 6/2002 | Kupper et al. |
| 6,492,900 B2 | 12/2002 | Rankin |
| 6,546,780 B1 | 4/2003 | Palfenier et al. |
| 6,866,611 B2 | 3/2005 | Tsuzuki et al. |
| 6,904,823 B2 | 6/2005 | Levin et al. |
| 7,042,363 B2 | 5/2006 | Katrak et al. |
| 7,142,132 B2 | 11/2006 | Katrak et al. |
| 7,242,329 B2 | 7/2007 | Katrak |
| 7,280,333 B2 | 10/2007 | Horsky et al. |
| 7,383,120 B2 | 6/2008 | Stockbridge et al. |
| 7,549,108 B2 | 6/2009 | Katrak et al. |
| 2001/0041955 A1* | 11/2001 | Nada .................. 701/29 |
| 2004/0059480 A1* | 3/2004 | Hrovat et al. .......... 701/34 |
| 2006/0082386 A1 | 4/2006 | Katrak et al. |
| 2006/0100758 A1 | 5/2006 | Katrak et al. |
| 2006/0149496 A1 | 7/2006 | Takeuchi |
| 2006/0179962 A1* | 8/2006 | Katrak et al. ........... 74/335 |
| 2006/0190142 A1 | 8/2006 | Katrak et al. |
| 2007/0101236 A1 | 5/2007 | Bauerle et al. |
| 2008/0139363 A1* | 6/2008 | Williams .............. 477/111 |

\* cited by examiner

TRANSMISSION CONTROL MODULE WITH MULTIPLE SENSOR INPUTS

CROSS-REFERENCE TO RELATED APPLICATION

This application claims priority to provisional patent applications U.S. 61/157,973 and 61/157,976 filed on Mar. 6, 2009, the contents of which are incorporated by reference.

BACKGROUND

A transmission may include various sensors that provide a transmission control module with information about the transmission. The sensors may output signals to the transmission control module, and the transmission control module may control the operation of the transmission based on the signals output by the sensors. Therefore, a transmission control module or sensor failure may cause the transmission to malfunction. It may be difficult, however, for the transmission control module to distinguish between an internal (e.g., processing path) failure and a sensor failure. Accordingly, a transmission control module is needed that is able to distinguish between internal failures and sensor failures.

DETAILED DESCRIPTION

An exemplary transmission control system is configured to distinguish between a sensor failure and a processing path failure when controlling a transmission system. The transmission control system includes a first sensor configured to measure a quantity and output a first signal representative of the quantity measured. A second sensor is configured to separately measure the quantity measured by the first sensor and output a second signal representative of the quantity measured. A transmission control module in communication with the first sensor and the second sensor is configured to compare the first signal to the second signal to determine if the first sensor is unreliable, process the first signal along a primary processing path, process the second signal along a secondary processing path, and compare the processed first signal to the processed second signal to determine if the primary processing path is unreliable.

Figure 1:
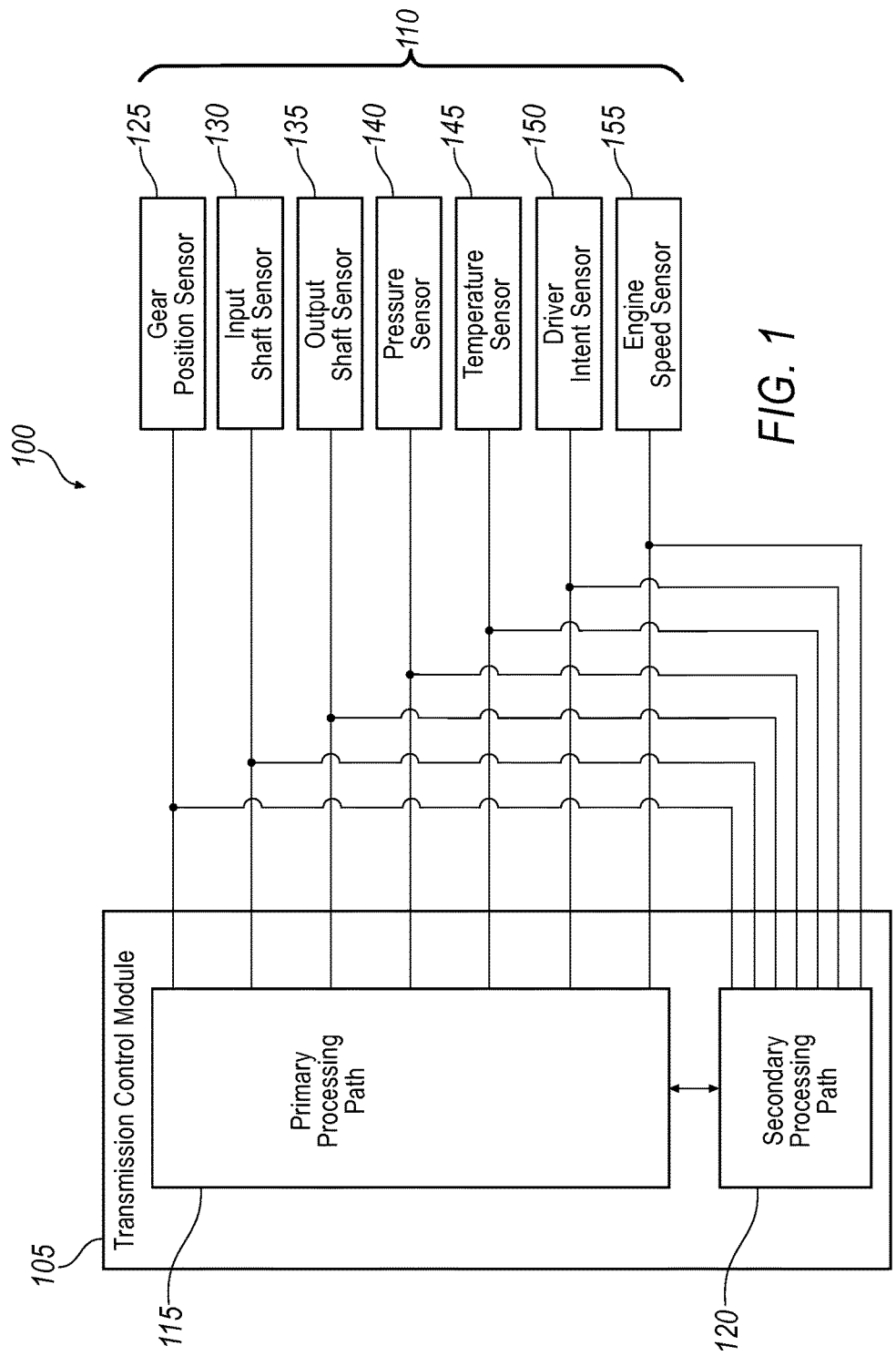
FIG. 1 illustrates an exemplary transmission control module configured to process signals from a plurality of sensors along a primary processing path and a secondary processing path.

FIG. 1 illustrates an exemplary transmission control system 100 that may be used to control operation of a transmission. For example, the transmission control system 100 may be configured to output control signals that actuate one or more clutches by causing a solenoid valve to open or close. The transmission control system 100 may be used in a single-clutch or dual-clutch transmission system. The transmission control system 100 may take many different forms and include multiple and/or alternate components and facilities. While an exemplary transmission control system 100 is shown in FIG. 1, the exemplary components illustrated in the figures are not intended to be limiting. Indeed, additional or alternative components and/or implementations may be used.

As illustrated in FIG. 1, the transmission control system 100 may include a transmission control module 105 configured to process signals from one or more sensors 110 along a primary processing path 115 and a secondary processing path 120. The transmission control module 105 may include one or more processing units that receive signals from one or more sensors 110. Specifically, the primary processing path 115 may be part of a main processing unit and the secondary processing path 120 may be part of the main processing unit or a secondary processing unit. If part of the main processing unit, the secondary processing path 120 may be independent and heterogeneous from the primary processing path 115. For instance, the secondary processing path 120 may apply a different heuristic than is applied along the primary processing path 115. If the secondary processing path 120 is part of a secondary processing unit that is separate from the main processing unit, the secondary processing path 120 is automatically independent and heterogeneous relative to the primary processing path 115. Accordingly, the transmission control module 105 may be configured to apply different heuristics to the signals along the primary processing path 115 and the secondary processing path 120. This way, the transmission control module 105 may independently and heterogeneously process signals along the primary and secondary processing paths 115, 120 before outputting control signals to, for example, solenoid valves in the transmission system.

The transmission control module 105 may receive signals from one or more sensors 110 and, using a processing unit, process the signals along the primary processing path 115, the secondary processing path 120, or both. The heuristics applied along the primary and secondary processing paths 115, 120 may be performed by the same or different processing units as previously discussed. In any event, the heuristics applied to the signal along the primary and secondary processing paths 115, 120 are different. For instance, a first heuristic may be applied to signals along the primary processing path 115 while a second heuristic may be applied to signals along the secondary processing path 120.

After the signal has been processed along the primary and secondary processing paths 115, 120, the transmission control module 105 may be configured to compare the processed signals to one another. If the signal processed along the primary processing path 115 is substantially the same as the signal processed along the secondary processing path 120, the transmission control module 105 may determine that the primary processing path 115 is operating correctly and control the transmission based on the signals processed along the primary processing path 115. However, if the signal processed along the primary processing path 115 is substantially different than the signal processed along the secondary processing path 120, the transmission control module 105 may be configured to conclude that the primary processing path 115 is unreliable and use the signal processed along the secondary processing path 120 to control the transmission. Moreover, once determining that the primary processing path 115 has failed, the transmission control module 105 may be configured to discontinue comparing signals processed along the primary processing path 115. Further, the transmission control module 105 may be configured to stop receiving signals at the primary processing path 115 and rely only on the signals received and processed along the secondary processing path 120. In one exemplary approach, a watchdog processor (not shown) may monitor the secondary processing path 120 to determine whether the secondary processing path 120 is working properly (i.e., reliable). The watchdog processor may be part of the transmission control module 105, may be separate from the transmission control module 105, and may include a separate processing unit than that of the transmission control module 105.

The transmission control system may 100 include any number of sensors 110 that measure a quantity in the transmission system and generate a signal that represents the quantity measured. For instance, as illustrated in FIG. 1, the transmission control system 100 may include one or more gear position sensors 125 configured to output a signal representative of the actual position of one or more shift rails in a transmission. One or more input shaft sensors 130 may be configured to measure a speed of an input shaft of the transmission while one or more output shaft sensors 135 may be configured to measure a speed of an output shaft of the transmission. If the transmission system is at least partially hydraulically or pneumatically controlled, the transmission control system 100 may further include one or more pressure sensors 140 to measure hydraulic or pneumatic pressure in the transmission system. Further, the transmission system may include one or more temperature sensors 145 to measure a temperature of one or more portions of the transmission system. One or more driver intent sensors 150 may be configured to output a signal representative of the intended gear of the driver. One or more engine speed sensors 155 may be configured to output a signal representing the speed of the engine. For instance, the engine speed sensor 155 may be configured to measure a flywheel or crankshaft speed and determine the engine speed from the speed of the flywheel or crankshaft.

As illustrated in FIG. 1, the sensors 110 are in communication with the transmission control module 105 and configured to output signals to be processed along both the primary processing path 115 and the secondary processing path 120. In this exemplary approach, however, the transmission control module 105 may be unable to determine if one or more of the sensors 110 fails.

Figure 2:
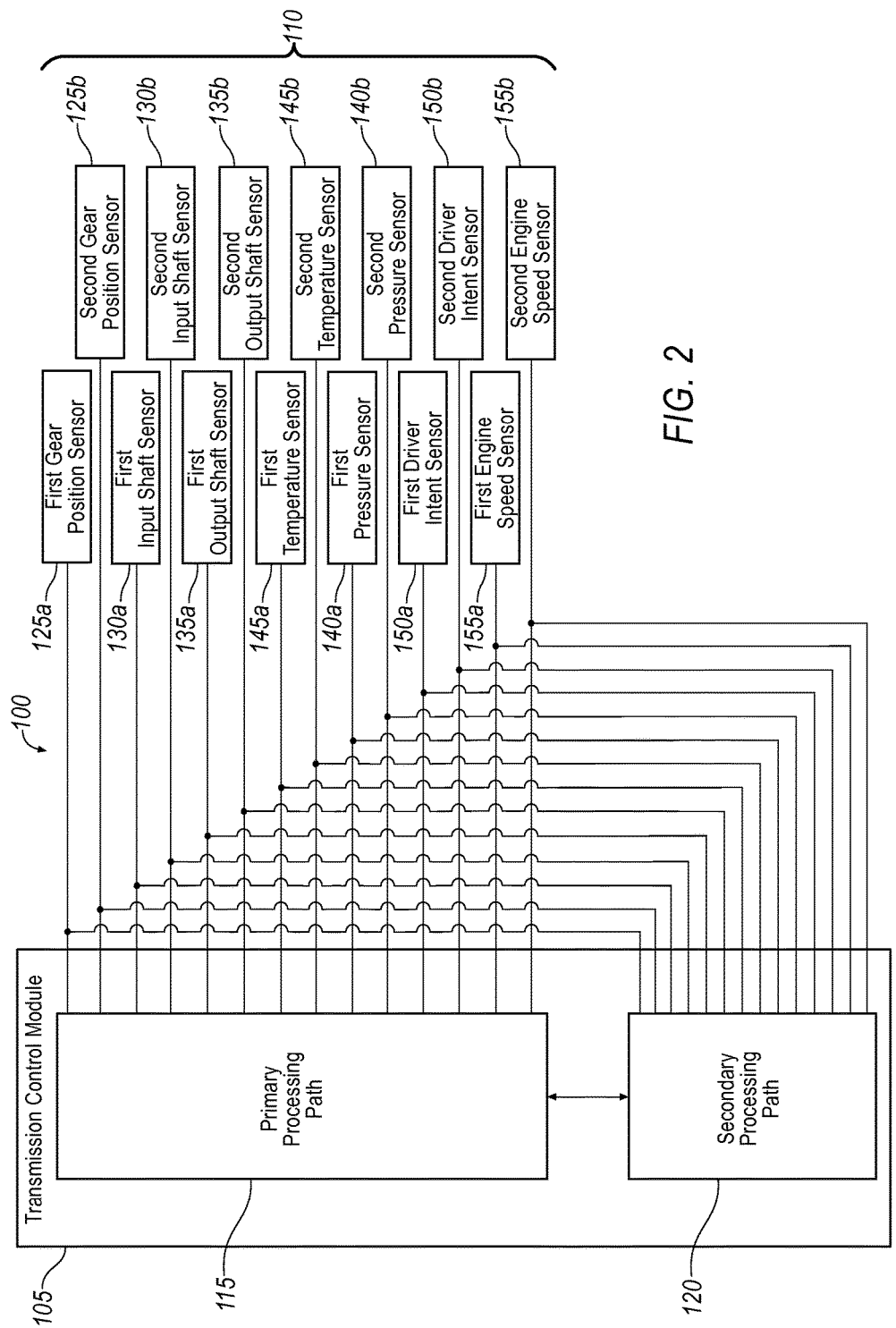
FIG. 2 illustrates an exemplary transmission control module configured to process signals from multiple sensors along the primary processing path and the secondary processing path.

FIG. 2 illustrates multiple sensors 110 in communication with the transmission control module 105. Specifically, the transmission system of FIG. 2 includes pairs of sensors 110 that separately measure the same quantity of the transmission system. For instance, the transmission system may include a first gear position sensor 125A and a second gear position sensor 125B, both configured to separately measure a position of the same shift rail in the transmission. The signals output by the first and second gear position sensors 125A, 125B are transmitted to the transmission control module 105 and processed along both the primary and secondary processing paths 115, 120. In this exemplary approach, the transmission control module 105 may be configured to determine that a difference between the signals processed by the primary and secondary processing paths 115, 120 was caused by a failure in the primary processing path 115 or a failure in either the first or second gear position sensors 125A, 125B. Other sensor pairs may include a first and second input shaft sensor 130A, 130B, a first and second output shaft sensor 135A, 135B, a first and second temperature sensor 145A, 145B, a first and second pressure sensor 140A, 140B, a first and second driver intent sensor 150A, 150B, and a first and second engine speed sensor 155A, 155B that separately measure various quantities and output signals to the transmission control module 105 along both the primary and secondary processing paths 115, 120. The transmission control module 105 may be configured to determine whether one of the sensors 110 is unreliable by comparing the signals output by each of the sensors 110 before processing the signals along the primary and secondary processing paths 115, 120. As previously discussed, the transmission control module 105 may be configured to determine whether the primary processing path 115 is unreliable by comparing the signals after processing along the primary and secondary processing paths 115, 120.

One sensor of pair of sensors may directly measure a quantity in the transmission while another sensor of pair of sensors may indirectly measure the quantity. Directly measuring the quantity may include using the sensor to measure a quantity of a portion of the transmission associated with a desired quantity and outputting a signal that is a representation of the quantity measured. Indirectly measuring the quantity may include using the sensor to measure a portion of the transmission that is not associated with the desired quantity, converting the measurement to the desired quantity, and outputting a signal representative of the desired quantity. The signal representing the directly measured quantity may be compared to the signal representing the indirectly measured quantity. For example, the first and second driver intent sensors 150A, 150B may be used to directly identify the intended gear (e.g., the desired quantity) determined by the driver and output a first signal representative of the intended gear. The first and second gear position sensors 125A, 125B may be configured to indirectly measure the position of one or more shift rails and convert the positions of the shift rails to the intended gear (e.g., the desired quantity). The first and second gear position sensors 125A, 125B may output a signal representing the positions of the shift rails, and the transmission control module 105 may convert the signal output by the first and second gear position sensors 125A, 125B to a second signal representing the intended gear. Although measured by different groups of sensors 110 at different locations, the first signal is related to the second signal (e.g., both signals represent the intended gear, which is the desired quantity). The transmission control module 105 may be configured to compare the first signal to the second signal to verify that the first and second gear position sensor 125A, 125B are operating properly. The transmission control module 105 may determine that the first gear position sensor 125A is working properly if the signals generated are substantially the same as the signals generated by the second gear position sensor 125B.

The transmission control module 105 may be configured to identify other relationships between various sensors 110. For example, the transmission control module 105 may determine whether the driver intent sensors 150 or the output shaft sensors 135 are working properly by comparing signals output by the driver intent sensors 150 to the output shaft sensors 135. Specifically, while the vehicle is moving, the speed of the vehicle may be used to determine whether the transmission is in third, fourth, fifth, or sixth gear. The transmission control module 105 may use this information to determine whether the driver intent sensors 150 are working properly. Specifically, if the vehicle is moving, as identified by the engine speed sensors 155, and the transmission is in fourth gear, as identified by the gear positions sensors 125, but the driver intent sensors 150 indicate that the shift lever is in the park position, then the transmission control module 105 may conclude that one or both of the driver intent sensors 150 are unreliable.

In another exemplary approach, the transmission control module 105 may be configured to use one sensor in a sensor pair to determine if another sensor in the sensor pair is unreliable. For instance, the first driver intent sensor 150A may be configured to determine whether the shift lever is in the reverse, neutral, or drive position. In this exemplary approach, the drive position includes the "hold" and "low" positions. However, the second driver intent sensor 155B may be configured to distinguish between reverse, neutral, drive, hold, or low positions. Accordingly, if the first driver intent sensor 150A determines that the gear shifter is in the drive position and the second driver intent sensor 150B determines that the gear shifter is in the driver, hold, or low position, the transmission control module 105 may conclude that both driver intent sensors 150A, 150B are working properly and are reliable. The transmission control module 105 may confirm this conclusion using one or more of the other sensors, such as the gear position sensors 125 or the engine speed sensors 155. If, however, the first driver intent sensor 150A determines that the gear shifter is in the reverse position but the second driver intent sensor 150B determines that the gear shifter is in the drive position, the transmission control module 105 may determine that either one of the driver intent sensors 150 has malfunctioned. The transmission control module 105 may determine which driver intent sensor 150 has malfunctioned using other sensors, such as the gear position sensors 125 or the engine speed sensors 155.

The transmission control module 105 may be configured to identify other relationships between various sensors 110. For instance, there may be a relationship between a primary clutch input shaft speed and a pressure for that clutch. Accordingly, the input shaft sensor 130 and the pressure sensor 140 associated with the primary clutch would have a relationship identifiable by the transmission control module 105. Further, line pressure may indirectly affect shift pressure, so various pressure sensors 140 may be used to identify this relationship. The transmission control module 105 may be configured to determine if one of the pressure sensors 140 has malfunctioned based on this relationship.

Figure 3:
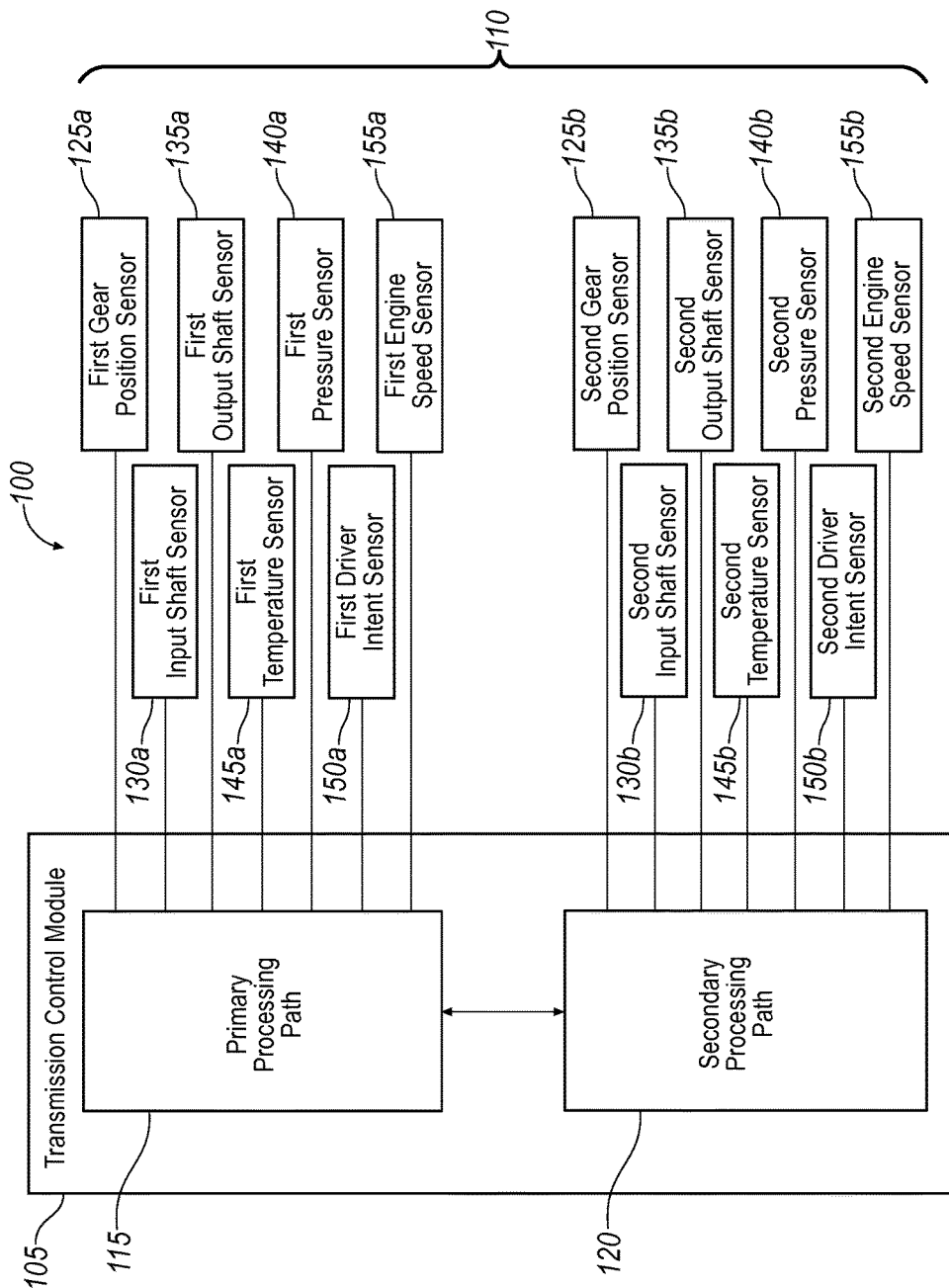
FIG. 3 illustrates an exemplary transmission control module configured to process signals from multiple sensors along the primary processing path or the secondary processing path.

FIG. 3 illustrates an exemplary transmission control module 105 configured to process signals from multiple sensors 110 along the primary processing path 115 or the secondary processing path 120, but not both. In FIG. 3, each sensor 110 outputs a signal to the transmission control module 105. The transmission control module 105 applies either the first heuristic along the primary processing path 115 or the second heuristic along the second processing path to the signals received. As illustrated, the transmission control module 105 may process the signals output by the first gear position sensor 125A, the first input shaft sensor 130A, the first output shaft sensor 135A, the first temperature sensor 145A, the first pressure sensor 140A, the first driver intent sensor 150A, and the first engine speed sensor 150B along the primary processing path 115. The transmission control module 105 may further process the signals output by the second gear position sensor 125B, the second clutch input shaft sensor 130, the second clutch output shaft sensor 135, the second temperature sensor 145B, the second pressure sensor 140B, the second driver intent sensor 150B, and the second engine speed sensor 155B along the secondary processing path 120.

The transmission control module 105 may be configured to compare the signals from each pair of sensors 110 after processing the signal to determine whether one of the sensors 110 is unreliable. Moreover, the transmission control module 105 may be configured to compare the signals processed along the primary processing path 115 to the signals processed along the secondary processing path 120 to determine if the primary processing path 115 is unreliable.

Computing devices, such as the transmission control module 105, generally include computer-executable instructions, where the instructions may be executable by one or more processing units along one or more processing paths. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 4:
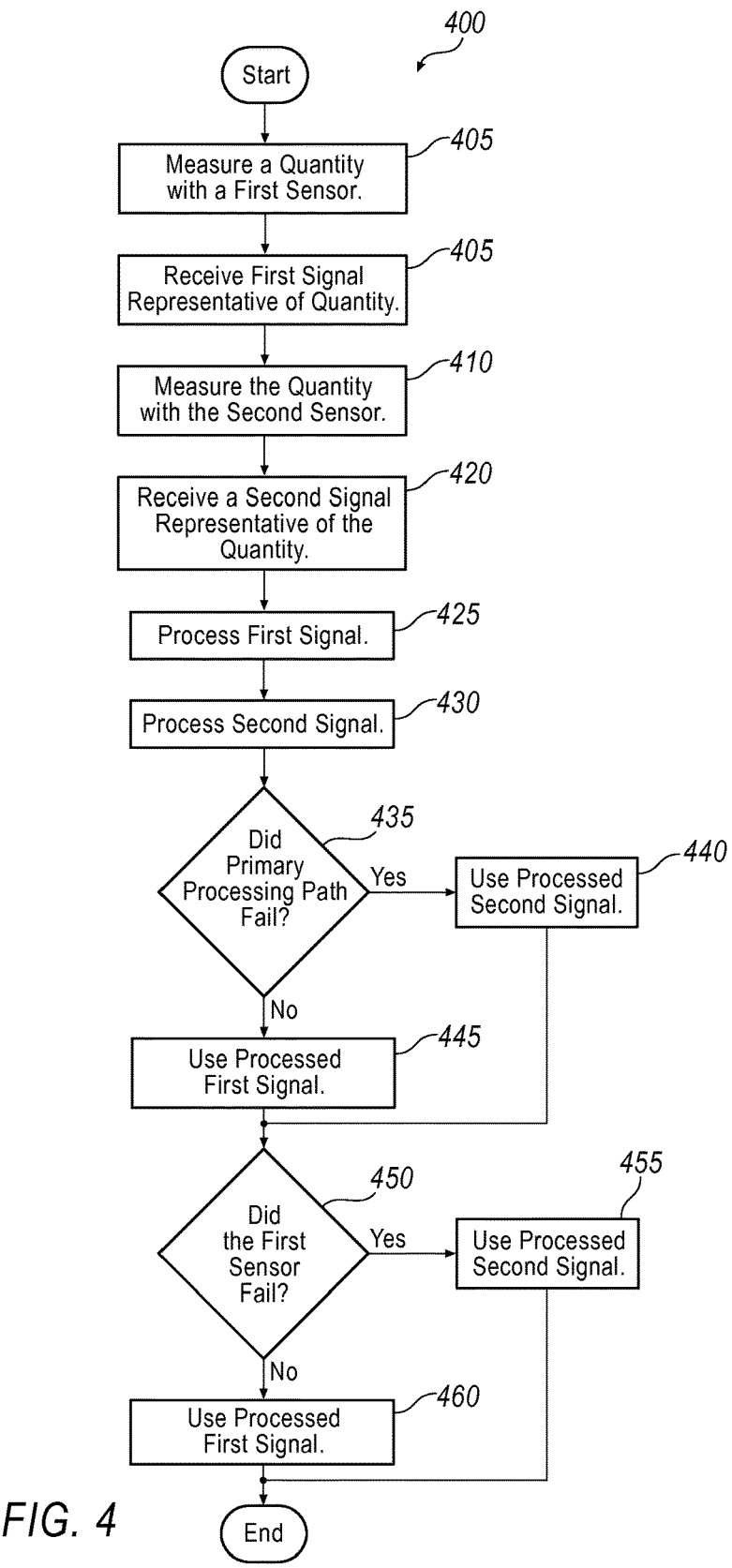
FIG. 4 illustrates a flowchart of an exemplary process executed by the transmission control module.

FIG. 4 illustrates an exemplary process 400 that may be performed by the transmission control system 100 so the transmission control module 105 may determine whether the primary processing path 115 or one of the sensors 110 is unreliable.

Block 405 may include measuring a quantity with a first sensor. For example, the first quantity may be a position of a shift rail measured by the first gear position sensor 125A, an input shaft speed measured by the first input shaft sensor 130A, an output shaft speed measured by the first output shaft sensor 135A, a temperature measured by the first temperature sensor 145A, a pressure measured by the first pressure sensor 140A, a driver intent measured by the first driver intent sensor 150A, or an engine speed measured by the first engine speed sensor 155B. As previously discussed, the first sensor may directly or indirectly measure the quantity as described above.

Block 410 may include receiving a first signal representative of the quantity at the transmission control module 105. For example, the first signal may represent the measured shift rail position, input shaft speed, output shaft speed, temperature, pressure, gear shifter position, or engine speed. Once measured, the first signal may be output to the transmission control module 105.

Block 415 may include measuring the quantity with a second sensor. For example, the second sensor may include the second gear position sensor 125B measuring the position of the shift rail, the second input shaft sensor 130B measuring the input shaft speed, the second output shaft sensor 135B measuring the output shaft speed, the second temperature sensor 145B measuring temperature, the second pressure sensor 140B measuring pressure, the second driver intent sensor 150B measuring the gear shifter position, or the second engine speed sensor 155B measuring engine speed. As previously discussed, the quantity may be directly or indirectly measured by the second sensor as described above.

Block 420 may include receiving a second signal representative of the quantity at the transmission control module 105. The second signal may represent the measured shift rail position, input shaft speed, output shaft speed, temperature, pressure, gear shifter position, or engine speed. Once measured, the second signal may be output to the transmission control module 105.

Block 425 may include processing the first signal along the primary processing path 115. The transmission control module 105 may apply a first heuristic to the first signal along the primary processing path 115. The transmission control module 105 may be configured to process the first signal prior to determining whether the primary processing path 115 and the first sensor are reliable. Moreover, the transmission control module 105 may be configured to only process the first signal if received from a reliable sensor. For example, once the transmission control module 105 has determined that a sensor is unreliable (see block 450), the transmission control module 105 may ignore signals from that sensor and only process signals received from reliable sensors.

Block 430 may include processing the second signal along the secondary processing path 120 independently of the first signal. For instance, the transmission control module 105 may apply a second heuristic to the second signal along the secondary processing path 120. In this exemplary approach, the second heuristic is different than the first heuristic applied along the primary processing path 115. The transmission control module 105 may be configured to process the second signal prior to determining whether the primary processing path 115 and the first sensor are working properly. Unlike with the first signal, the transmission control module 105 may be configured to process the second signal regardless of whether the first sensor is reliable.

Decision block 435 may include determining if the primary processing path 115 is unreliable by, for example, determining whether the processed first signal is substantially the same as the processed second signal to. If the processed first signal and processed second signal are substantially different, the transmission control module 105 may determine that the primary processing path 115 is unreliable and use the processed second signal to control the transmission as illustrated at block 440. Moreover, the transmission control module 105 may be configured to ignore signals processed along the primary processing path 115, or alternatively, prevent signals from being processed along the primary processing path 115. If, however, the processed first and second signals are substantially the same, the transmission control module 105 may determine that the primary processing path 115 is reliable and use the processed first signal to control the transmission as indicated at block 445.

Decision block 450 may include determining whether the first sensor is unreliable. For example, the transmission control module 105 may be configured to compare the processed first signal to the processed second signal. If the processed first signal is substantially different than the processed second signal, the transmission control module 105 may be configured to determine that the first sensor is unreliable and control the transmission based on the second signal received from the second sensor as indicated at block 455. In addition, the transmission control module 105 may be configured to ignore future signals received from the first sensor. However, if the processed first signal is substantially the same as the processed second signal, the transmission control module 105 may determine that the processed first sensor is reliable and control the transmission based on the processed first signal received from the first sensor as illustrated at block 460. The transmission control module 105 may be configured to only compare the processed first and second signals after determining that the primary processing path 115 is reliable.

The process may end after block 460.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A transmission system comprising:
   a first sensor configured to measure a quantity and output a first signal representative of the quantity measured;
   a second sensor configured to separately measure the quantity measured by the first sensor and output a second signal representative of the quantity measured; and
   a transmission control module in communication with the first sensor and the second sensor and configured to process the first signal along a primary processing path and a secondary processing path, process the second signal along the primary processing path and the secondary processing path, compare the processed first signal to the processed second signal, and determine if the primary processing path and the first sensor are reliable.

2. A transmission system as set forth in claim 1, wherein the transmission control module is configured to process the first signal and the second signal prior to determining whether the first sensor is reliable.

3. A transmission system as set forth in claim 2, wherein the transmission control module is configured to apply a first heuristic to the first signal and the second signal along the primary processing path and apply a second heuristic to the first signal and the second signal along the secondary processing path.

4. A transmission system as set forth in claim 1, wherein the transmission control module is configured to compare the processed first signal to the processed second signal to determine if the primary processing path is reliable prior to determining if the first sensor is reliable.

5. A transmission system as set forth in claim 1, wherein the transmission control module is configured to apply a first heuristic to the first signal and the second signal along the primary processing path and a second heuristic to the first signal and the second signal along the secondary processing path.

6. A transmission system as set forth in claim 1, wherein the first sensor is configured to directly measure the quantity and the second sensor is configured to indirectly measure the quantity.

7. A transmission system as set forth in claim 1, wherein at least one of the first sensor and the second sensor includes at least one of a gear position sensor, a shaft speed sensor, a temperature sensor, a pressure sensor, a driver intent sensor, and an engine speed sensor.

8. A transmission system as set forth in claim 1, wherein the transmission control module is configured to determine that the primary processing path and the first sensor are reliable if the processed first signal and the processed second signal are substantially the same.

9. A method comprising:
   receiving a first signal representative of a quantity in a transmission system generated by a first sensor;
   receiving a second signal representative of the quantity in the transmission system generated by a second sensor;
   processing the first signal along a primary processing path and a secondary processing path;
   processing the second signal along the primary processing path and the secondary processing path;
   comparing the processed first signal to the processed second signal, and
   determining if the primary processing path and the first sensor are reliable.

10. A method as set forth in claim 9, wherein comparing the processed first signal to the processed second signal includes determining whether the primary processing path is reliable before determining whether the first sensor is reliable.

11. A method as set forth in claim 10, wherein comparing the processed first signal to the processed second signal determining whether the first sensor is reliable after the primary processing path is determined to be reliable.

12. A method as set forth in claim 9, wherein processing the first signal includes applying a first heuristic to the first signal along the primary processing path and a second heuristic to the first signal along the secondary processing path, and
   wherein processing the second signal includes applying the first heuristic to the second signal along the primary processing path and the second heuristic to the second signal along the secondary processing path.

13. A method as set forth in claim 9, further comprising measuring the quantity with the first sensor and the second sensor.

14. A method as set forth in claim 13, wherein measuring the quantity with the first sensor includes directly measuring the quantity with the first sensor.

15. A method as set forth in claim 14, wherein measuring the quantity with the second sensor includes indirectly measuring the quantity with the second sensor.

16. A method as set forth in claim 13, further comprising measuring at least one of a shift rail position, a gear shifter position, a speed, a temperature, and a pressure with the first sensor.

17. A method as set forth in claim 16, further comprising measuring at least one of a shift rail position, a gear shifter position, a speed, a temperature, and a pressure with the second sensor.

18. A transmission system comprising:
   a first sensor configured to directly measure a quantity and output a first signal representative of the quantity measured;
   a second sensor configured to indirectly measure the quantity measured by the first sensor and output a second signal representative of the quantity measured; and
   a transmission control module in communication with the first sensor and the second sensor, the transmission control module configured to apply a first heuristic to the first signal and the second signal along a primary processing path and apply a second heuristic to the first signal the second signal along a secondary processing path to process the first signal and the second signal, and wherein the transmission control module is configured to compare the processed first and second signals, and to determine if the primary processing path and first sensor are reliable.

19. A transmission system as set forth in claim 18, wherein the transmission control module is configured to compare the processed first signal to the processed second signal to determine if the primary processing path is reliable prior to determining if the first sensor is reliable.

20. A transmission system as set forth in claim 18, wherein the transmission control module is configured to determine that the primary processing path and the first sensor are reliable if the processed first signal and the processed second signal are substantially the same.

* * * * *